(12) United States Patent
Feinleib et al.

(10) Patent No.: US 7,603,721 B2
(45) Date of Patent: Oct. 13, 2009

(54) RESTRICTED SOFTWARE AND HARDWARE USAGE ON A COMPUTER

(75) Inventors: David A. Feinleib, Kirkland, WA (US); Carl L. Gulledge, Redmond, WA (US); Wassef Haroun, Seattle, WA (US); Joachim Kempin, Bellevue, WA (US); Kurt Kolb, Clyde Hill, WA (US); Brian K. Moran, Issaquah, WA (US); Edward L. Stubbs, Redmond, WA (US); Jacob D. Swed, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 663 days.

(21) Appl. No.: 11/266,450

(22) Filed: Nov. 3, 2005

(65) Prior Publication Data

US 2006/0053283 A1  Mar. 9, 2006

Related U.S. Application Data

(62) Division of application No. 09/568,095, filed on May 9, 2000, now abandoned.

(51) Int. Cl.
*H04L 9/00* (2006.01)
(52) U.S. Cl. .................................... 726/30; 713/165
(58) Field of Classification Search ............... 713/165; 726/30
See application file for complete search history.

(56) References Cited

U.S. PATENT DOCUMENTS

| | | | |
|---|---|---|---|
| 5,208,853 A | 5/1993 | Armbruster et al. | |
| 5,293,422 A | 3/1994 | Loiacono | |
| 5,349,643 A | 9/1994 | Cox et al. | |
| 5,365,587 A | 11/1994 | Campbell et al. | |
| 5,748,960 A | 5/1998 | Fischer | |
| 5,944,821 A | 8/1999 | Angelo | |
| 5,966,691 A | 10/1999 | Kibre et al. | |
| 5,968,136 A | 10/1999 | Saulpaugh et al. | |
| 6,067,575 A * | 5/2000 | McManis et al. | 719/313 |
| 6,175,924 B1 | 1/2001 | Arnold | |
| 6,298,025 B1 | 10/2001 | McPherson et al. | |

FOREIGN PATENT DOCUMENTS

EP  0849658 A2  6/1998

OTHER PUBLICATIONS

Microsoft Computer Dictionary, Microsoft Press, 2002, fifth edition, pp. 276 and 378.
Watts, W., "The protection racket", .EXE Magazine, vol. 5, Issue 5, Oct. 1990, pp. 12-13, 15-16 and 18.
Barbier, P., "Protection on a card with Argos", Micro-Systemes, No. 76, Jun. 1987, pp. 86-87.

(Continued)

*Primary Examiner*—Jacob Lipman

(57) ABSTRACT

A client computer runs an operating system that executes additional applications by loading them using an application loader and executes device drivers for peripheral devices by loading the drivers using a device loader. The operating system restricts the functionality of the operating system, such as by making selected portions and functionality of the operating system unavailable to the user or by limiting the user's ability to add software applications or device drivers to the computer. Additionally, various techniques can be used to remove or reduce the functionality limitations of the computer.

20 Claims, 10 Drawing Sheets

OTHER PUBLICATIONS

Ariet, B., "Methods for Protection against computer piracy, myth, and reality", Micro-Systems, No. 101, Oct. 1989, pp. 75-81.

Holmes, B., "Single-copy security", Software Protection, Systems International, vol. 16, No. 10, Oct. 1988, pp. 55-56.

Kuchinskas, S., "Aladdin knowledge Systems: securing the global village", EContent, vol. 26, No. 5, May 2003, pp. 50-51.

Lutz, A., "Access Protection. The safe PC", Personal Computer, No. 11, Nov. 1987, pp. 98, 100.

Yannicos, B., "Softguard protects programs. Copy protection module on the V.24 Interface", Mikrocomputer-Zeitschrift, No. 1, 1986, pp. 52-53.

* cited by examiner

RESTRICTED SOFTWARE AND HARDWARE USAGE ON A COMPUTER

RELATED APPLICATIONS

This application is a divisional application of U.S. patent application Ser. No. 09/568,095, filed May 9, 2000 now abandoned, which is hereby incorporated by reference herein.

TECHNICAL FIELD

This invention relates to computers and operating systems. More particularly, the invention relates to restricting usage of software and hardware on a computer.

BACKGROUND OF THE INVENTION

Computer technology is continually advancing, resulting in new computers that are more powerful and cheaper than their predecessors. Such advancement has had a significant affect on people, expanding the types of tasks people perform with their computers as well as increasing the number of people who use computers.

Many computers are currently manufactured with a general purpose "open architecture" operating system installed. An open architecture operating system refers to an operating system that makes numerous functions available to the user and also allows the user to modify the computer by installing additional software programs on the computer that provide additional functionality to the user or by removing software programs from the computer. The operating system can make a wide variety of functionality available to the user, such as recreational or educational programs, reference programs, productivity programs (such as word processing or database functionality), communications programs, etc.

One problem inherent in open architecture systems is they are generally licensed with complete use rights and/or functionality that may be beyond the need or desire of the system purchaser. Consequentially, the purchase price of these systems being indifferent to usage scenarios means users with limited needs pay the same rate for these systems as those with universal needs.

An additional problem with open architecture systems is that virtually anyone can write an application that can be executed on the system. Some applications or devices may not operate properly due to a problem with the application or associated driver, yet many users associate such problems with the manufacturer of the system. Thus, it would be beneficial to provide a way for the manufacturer of the system to control the extensibility of the system.

The invention described below addresses these disadvantages by providing restricted software and hardware usage on a computer.

SUMMARY OF THE INVENTION

According to one aspect of the invention, a client computer runs an operating system that executes applications by loading them using an application loader and executes device drivers for peripheral devices by loading the drivers using a device loader. The client computer also includes a digest catalog that includes digital signatures for program files that can be executed by the client computer. When attempting to load an application or driver, the appropriate loader checks whether a digital signature for the corresponding program file(s) is included in the digest catalog. If no such digital signature is included, then the loader does not load the program file(s) corresponding to the application or driver.

According to another aspect of the invention, the digest catalog includes, for each program file corresponding to an application or driver that should be executable by the computer, a digitally signed hash value that is generated from a hash function based on the corresponding program file. When attempting to load a particular file, the loader generates a hash value and compares it to the decrypted hash values in the digest catalog. If the comparison results in no matches, then the corresponding program file (and thus the application or driver) is not loaded.

According to another aspect of the invention, a consumer initially purchases a computer with restricted functionality at a price that is less than the price that would be charged for a computer with full functionality. Subsequently, the user can, at an additional cost, acquire a digital key that allows the restrictions to be removed, upgrading the computer to full functionality.

According to another aspect of the invention, a consumer can execute additional applications or drivers on his or her computer by obtaining appropriate digital signatures for the additional applications or drivers to add to the digest catalog. In exchange for payment, a software or hardware vendor will acquire a digital signature(s) for the appropriate program files from the supplier of the program files. The digital signature(s) will then be transmitted to the consumer in exchange for payment to the vendor. The digital signature(s) can then be added to the digest catalog at the consumer's computer, so that the next time he or she attempts to execute the application or driver the appropriate signatures will be in the digest catalog and the program files will be loaded.

According to another aspect of the invention, a consumer can execute additional applications or drivers on his or her computer by obtaining the appropriate digital signatures for such applications or drivers from the same OEM (original equipment manufacturer) as manufactured the consumer's computer. The consumer's computer executes only applications that have in the digest catalog a digital signature of the OEM. Thus, the OEM can limit what additional applications are made available to the consumer.

According to another aspect of the invention, the OEM maintains a digest catalog that can be made available to the consumer's computer (either locally at the computer or remotely). The consumer, in exchange for payment, is given access to the digest catalog so that any applications for which a corresponding digital signature exists in the OEM's digest catalog can be executed at the client computer. The consumer can be given a limited amount of time (e.g., one month or one year) within which he or she can access the OEM's digest catalog.

BRIEF DESCRIPTION OF THE DRAWINGS

The present invention is illustrated by way of example and not limitation in the figures of the accompanying drawings. The same numbers are used throughout the figures to reference like components and/or features.

DETAILED DESCRIPTION

Figure 1:
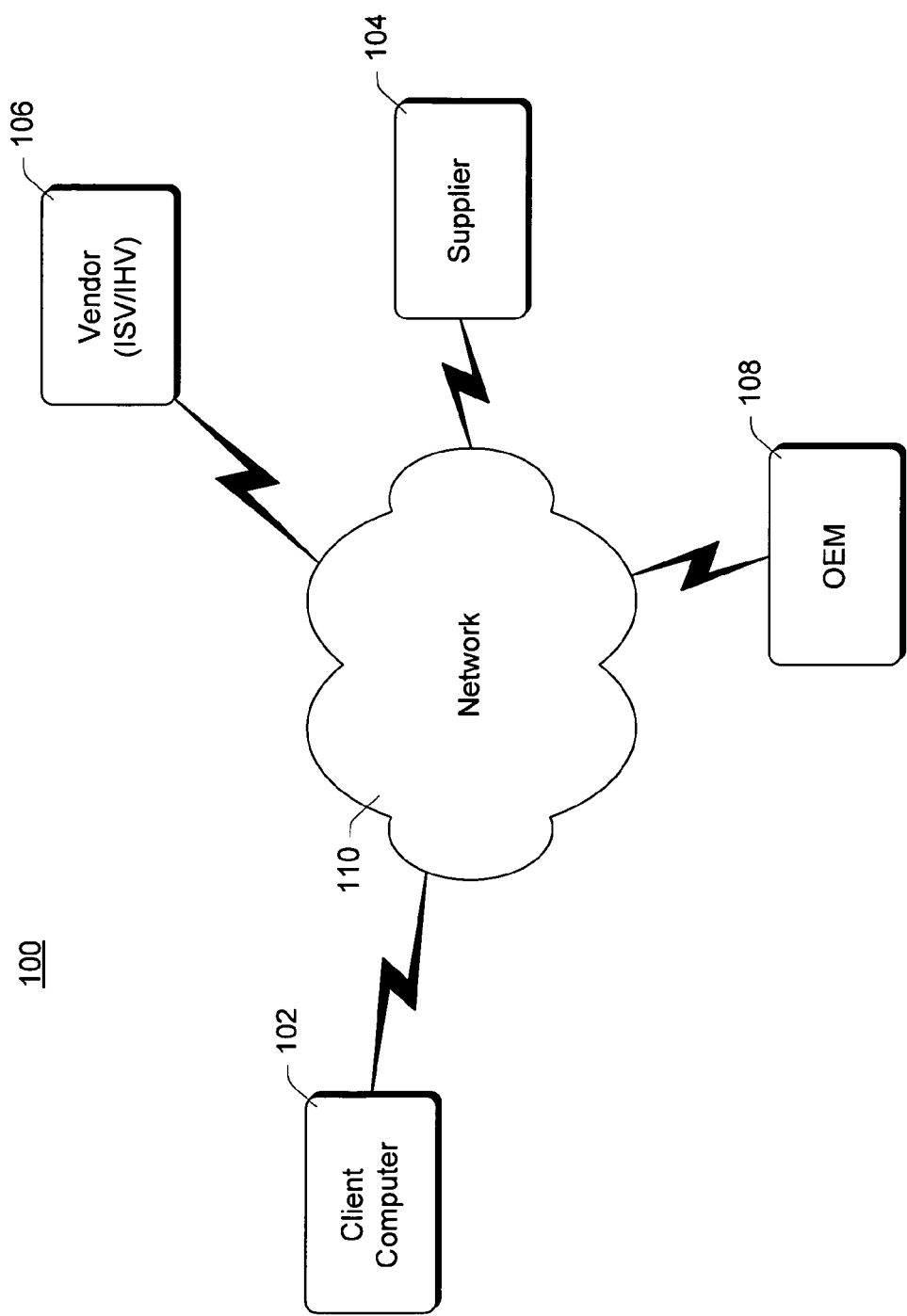
FIG. 1 shows a network system and environment in accordance with one embodiment of the invention.

FIG. 1 shows a network system and environment 100 in accordance with one embodiment of the invention. Generally, the system 100 includes one or more client or consumer computers 102, one or more suppliers 104, and can optionally include one or more vendors 106 and one or more original equipment manufacturers (OEMs) 108. Although illustrated as business entities, suppliers 104, vendors 106, and OEMs 108 each include one or more computers via which they can interact with network 110. The computers 102, suppliers 104, vendors 106, and OEMs 108 communicate with one another over a data communications network. The data communications network in FIG. 1 is a public network 110, such as the Internet. The data communications network might also include local-area networks and/or private wide-area networks, and can include both wired and wireless sections. Alternatively, one or more of computers 102, suppliers 104, vendors 106, and OEMs 108 may communicate with each other directly rather than via network 110.

Client computer 102 represents any of a wide variety of conventional computing devices. Examples of client computers 102 include personal computers (e.g., portable, palm-top, or desktop computers), microprocessor-based or programmable consumer electronics (e.g., a "WEBTV" terminal or a gaming console), etc.

Supplier 104 represents the source of additional electronic content, such as software applications or other files including instructions and/or data for a software application. Supplier 104 can be the actual author(s) of the electronic content, or alternatively an agent of the author(s) or other intervening device(s) between the actual author(s) and the network 110. The electronic content can be designed to be a complete product by itself when execute& by computer 102, or alternatively can be designed to work in conjunction with other software or hardware component(s).

Vendor 106 is a retailer of the electronic content provided by supplier 104. Examples of vendor 106 include an Independent Software Vendor (ISV) or an Independent Hardware Vendor (IHV) that sell the electronic content provided by supplier 104 for use with computers 102.

OEM 108 is a manufacturer and retailer of computers 102. OEM 108 may also be a retailer of the electronic content provided by supplier 104.

Figure 2:
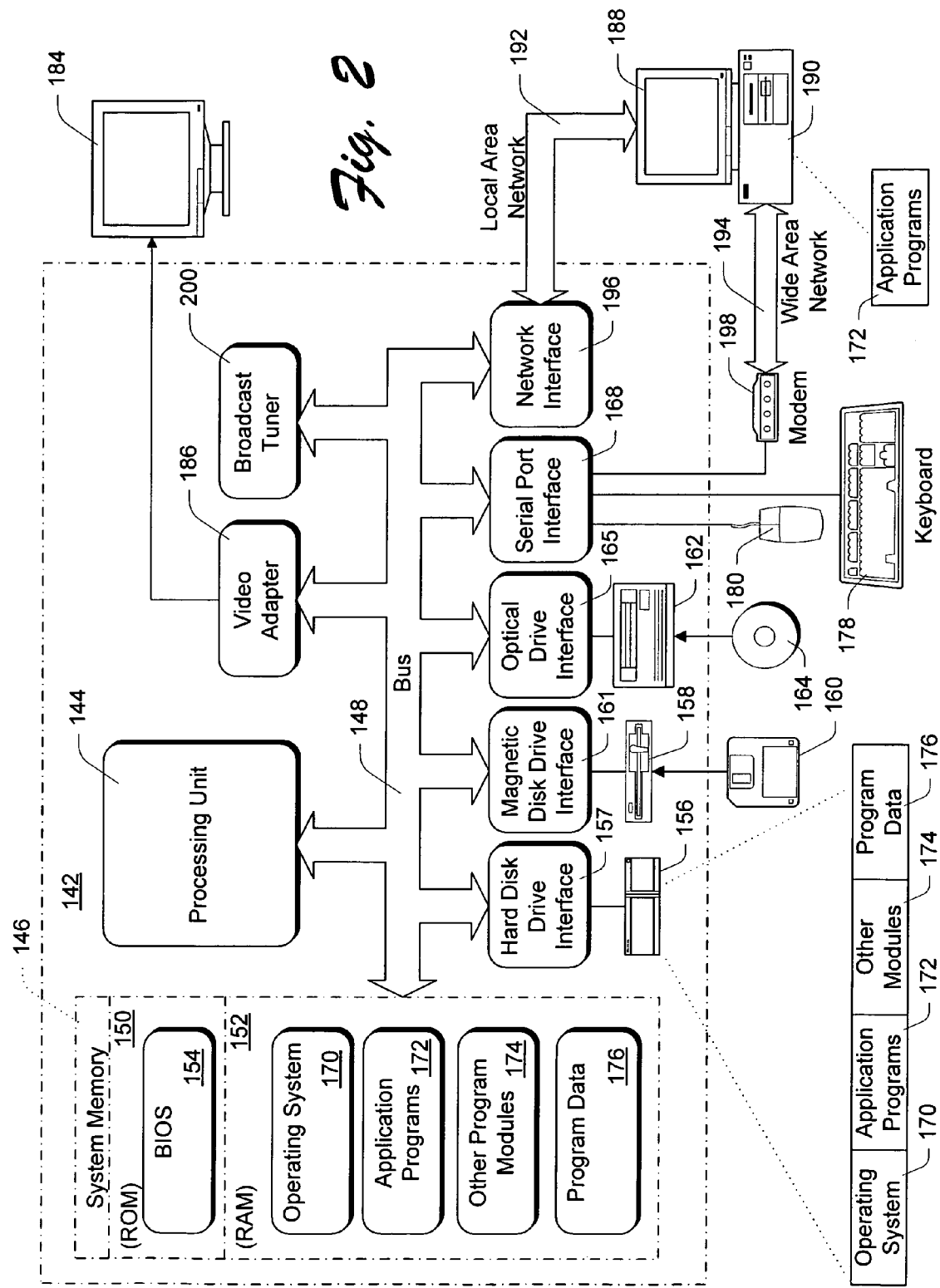
FIG. 2 shows a general example of a computer that can be used in accordance with the invention.

FIG. 2 shows a general example of a computer 142 that can be used in accordance with the invention. Computer 142 is shown as an example of a computer that can perform the functions of client computer 102, supplier 104, vendor 106, or OEM 108 of FIG. 1. Computer 142 includes one or more processors or processing units 144, a system memory 146, and a system bus 148 that couples various system components including the system memory 146 to processors 144.

The bus 148 represents one or more of any of several types of bus structures, including a memory bus or memory controller, a peripheral bus, an accelerated graphics port, and a processor or local bus using any of a variety of bus architectures. The system memory includes read only memory (ROM) 150 and random access memory (RAM) 152. A basic input/output system (BIOS) 154, containing the basic routines that help to transfer information between elements within computer 142, such as during start-up, is stored in ROM 150. Computer 142 further includes a hard disk drive 156 for reading from and writing to a hard disk, not shown, connected to bus 148 via a hard disk driver interface 157 (e.g., a SCSI, ATA, or other type of interface); a magnetic disk drive 158 for reading from and writing to a removable magnetic disk 160, connected to bus 148 via a magnetic disk drive interface 161; and an optical disk drive 162 for reading from or writing to a removable optical disk 164 such as a CD ROM, DVD, or other optical media, connected to bus 148 via an optical drive interface 165. The drives and their associated computer-readable media provide nonvolatile storage of computer readable instructions, data structures, program modules and other data for computer 142. Although the exemplary environment described herein employs a hard disk, a removable magnetic disk 160 and a removable optical disk 164, it should be appreciated by those skilled in the art that other types of computer readable media which can store data that is accessible by a computer, such as magnetic cassettes, flash memory cards, digital video disks, random access memories (RAMs) read only memories (ROM), and the like, may also be used in the exemplary operating environment.

A number of program modules may be stored on the hard disk, magnetic disk 160, optical disk 164, ROM 150, or RAM 152, including an operating system 170, one or more application programs 172, other program modules 174, and program data 176. Operating system 170 can be any of a variety of operating systems, such as any of the "Windows" family of operating systems available from Microsoft Corporation of Redmond, Wash. A user may enter commands and information into computer 142 through input devices such as keyboard 178 and pointing device 180. Other input devices (not shown) may include a microphone, joystick, game pad, satellite dish, scanner, or the like. These and other input devices are connected to the processing unit 144 through an interface 182 that is coupled to the system bus. A monitor 184 or other type of display device is also connected to the system bus 148 via an interface, such as a video adapter 186. In addition to the monitor, personal computers typically include other peripheral output devices (not shown) such as speakers and printers.

Computer 142 can optionally operate in a networked environment using logical connections to one or more remote computers, such as a remote computer 188. The remote computer 188 may be another personal computer, a server, a router, a network PC, a peer device or other common network node, and typically includes many or all of the elements described above relative to computer 142, although only a memory storage device 190 has been illustrated in FIG. 2. The logical connections depicted in FIG. 2 include a local area network (LAN) 192 and a wide area network (WAN) 194. Such networking environments are commonplace in offices, enterprise-wide computer networks, intranets, and the Internet. In the described embodiment of the invention, remote computer 188 executes an Internet Web browser program such as the "Internet Explorer" Web browser manufactured and distributed by Microsoft Corporation of Redmond, Wash.

When used in a LAN networking environment, computer 142 is connected to the local network 192 through a network interface or adapter 196. When used in a WAN networking environment, computer 142 typically includes a modem 198 or other means for establishing communications over the wide area network 194, such as the Internet. The modem 198, which may be internal or external, is connected to the system bus 148 via a serial port interface 168. In a networked environment, program modules depicted relative to the personal computer 142, or portions thereof, may be stored in the remote memory storage device. It will be appreciated that the network connections shown are exemplary and other means of establishing a communications link between the computers may be used.

Computer 142 can also optionally include one or more broadcast tuners 200. Broadcast tuner 200 receives broadcast signals either directly (e.g., analog or digital cable transmissions fed directly into tuner 200) or via a reception device (e.g., via an antenna or satellite dish (not shown)).

Generally, the data processors of computer 142 are programmed by means of instructions stored at different times in the various computer-readable storage media of the computer. Programs and operating systems are typically distributed, for example, on floppy disks or CD-ROMs. From there, they are installed or loaded into the secondary memory of a computer. At execution, they are loaded at least partially into the computer's primary electronic memory. The invention described herein includes these and other various types of computer-readable storage media when such media contain instructions or programs for implementing the steps described below in conjunction with a microprocessor or other data processor. The invention also includes the computer itself when programmed according to the methods and techniques described below. Furthermore, certain sub-components of the computer may be programmed to perform the functions and steps described below. The invention includes such sub-components when they are programmed as described. In addition, the invention described herein includes data structures, described below, as embodied on various types of memory media.

For purposes of illustration, programs and other executable program components such as the operating system are illustrated herein as discrete blocks, although it is recognized that such programs and components reside at various times in different storage components of the computer, and are executed by the data processor(s) of the computer.

In the discussion below, embodiments of the invention will be described in the general context of computer-executable instructions, such as program modules, being executed by one or more conventional personal computers. Generally, program modules include routines, programs, objects, components, data structures, etc. that perform particular tasks or implement particular abstract data types. Moreover, those skilled in the art will appreciate that various embodiments of the invention may be practiced with other computer system configurations, including hand-held devices, multiprocessor systems, microprocessor-based or programmable consumer electronics, network PCs, minicomputers, mainframe computers, and the like. In a distributed computer environment, program modules may be located in both local and remote memory storage devices.

Alternatively, embodiments of the invention can be implemented in hardware or a combination of hardware, software, and/or firmware. For example, one or more modules for implementing the invention can be embodied in one or more application specific integrated circuits (ASICs).

Figure 3:
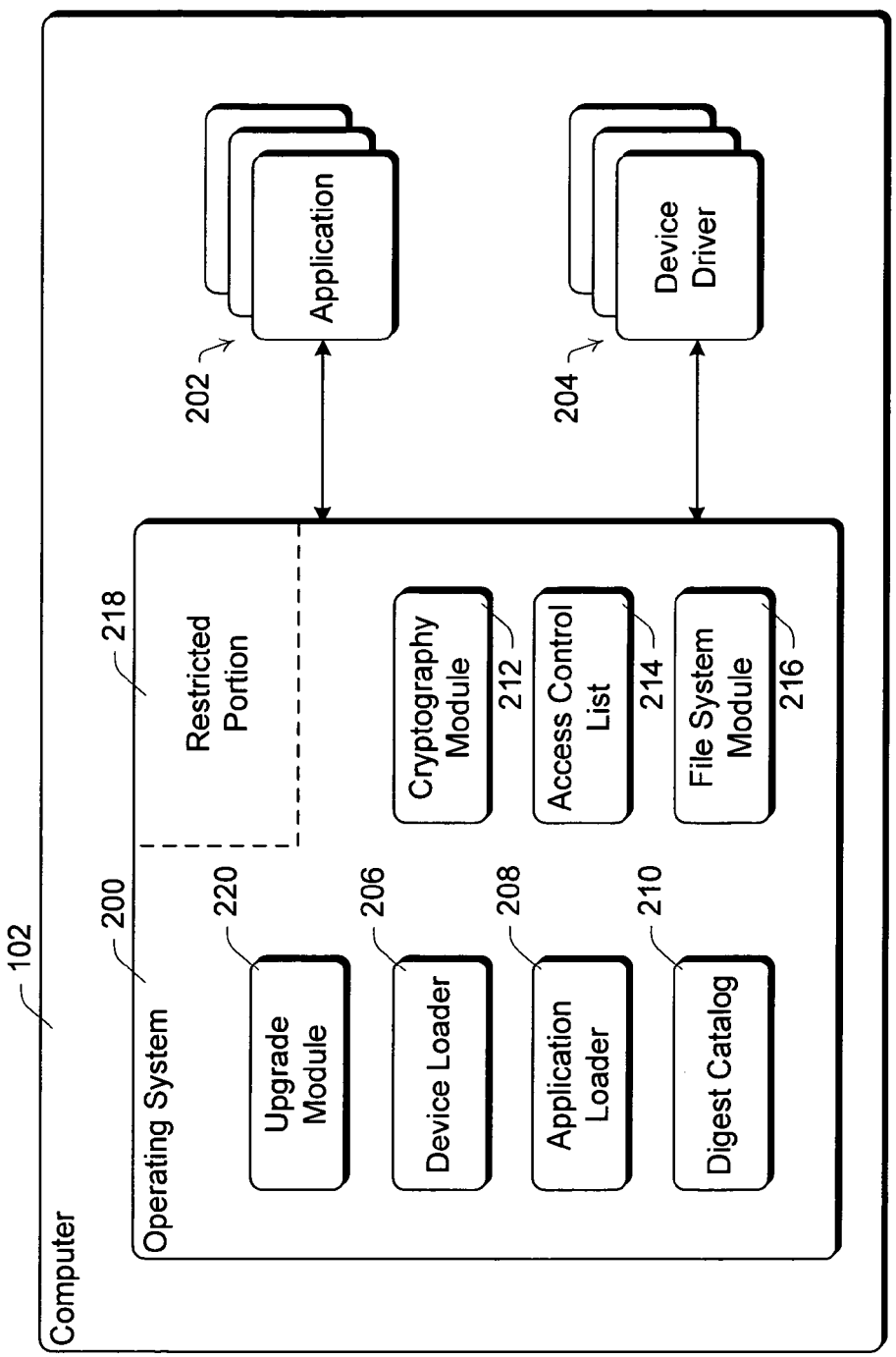
FIG. 3 is a block diagram illustrating selected components of an exemplary client computer in more detail.

FIG. 3 is a block diagram illustrating selected components of an exemplary client computer in more detail. Client computer 102 includes an operating system 200, one or more applications 202, and one or more device drivers 204. Operating system 200 controls the execution of software applications 202 on computer 102, provides a user interface to allow users to interact with operating system 200, and manages (with the assistance of device driver 204) the input and output of data and control information to and from computer 102.

Applications 202 represent software applications that can be executed by computer 102. Any of a wide variety of software applications can be executed by computer 102, including productivity, recreational, educational, entertainment, etc. applications. Device drivers 204 represent software modules that include instructions and/or data. A device driver 204 controls a corresponding peripheral device, allowing operating system 200 to communicate with the peripheral device when coupled to computer 102. Examples of such peripheral devices include input devices (such as digital cameras, scanners, keyboards, cursor control devices, etc.), output devices (such as monitors, printers, etc.), and combinations thereof (e.g., modems, network adapters, etc.).

Selected components of operating system 200 are illustrated in FIG. 3, including device loader 206, application loader 208, digest catalog 210, cryptography module 212, access control list 214, file system module 216, and upgrade module 220. Each of these components and modules 206, 208, 210, 212, 214, 216, and 220 represents a set of instructions to carry out various functions when executed by a processor, and are illustrated as separate components and modules for ease of illustration. Depending on the implementation of operating system 200, these instructions may be grouped together differently.

Device loader 206 includes instructions for loading device drivers 204 stored in one or more files of nonvolatile memory into the volatile system RAM. Once loaded into system RAM, the processor of computer 102 can execute (or otherwise access) the drivers, enabling operating system 200 to communicate with the corresponding peripheral devices.

Similarly, application loader 208 includes instructions for loading applications 202 stored in one or more files of nonvolatile memory into the volatile system RAM. Once loaded into system RAM, the processor of computer 102 can execute (or otherwise access) the application. It should be noted that although device drivers and applications are loaded into system RAM, at various times some of their instructions may be stored in nonvolatile memory instead (e.g., using a conventional "swap" file on a hard disk).

Digest catalog 210 stores digitally signed identifiers of the various applications 202 and device drivers 204 that should be executable on computer 102. Applications and drivers that "should be executable" on computer 102 refers to applications and/or drivers for which a supplier 104 of FIG. 1 has given their permission to execute on computer 102, rather than a technical or compatibility issue with computer 102.

Cryptography module 212 performs the necessary cryptographic functions of the invention, including generating and verifying digital signatures, encrypting and decrypting information, generating hash values from cryptographic hash functions, etc. The discussion herein assumes that the reader is familiar with public key cryptography. For a basic introduction to cryptography, the reader is directed to a text written by Bruce Schneier and entitled, "Applied Cryptography: Protocols, Algorithms, and Source Code in C," published by John Wiley & Sons, copyright 1994 (second edition 1996).

Access control list 214 stores a set of one or more entities that are allowed to modify digest catalog 210. An entity can be an individual or group of individuals, or alternatively machines (e.g., an identifier of supplier 104 or OEM 108 of FIG. 1). The identity of any entity trying to modify digest 210 is checked by operating system 200. If the entity is not identified in access control list 214, then any attempts to modify digest catalog 210 are ignored by operating system 200.

File system module 216 manages the storage of applications 202 and device drivers 204, as well as application data files (not shown) in the nonvolatile storage device(s) of computer 102.

Certain functions of operating system 200 may not be available to the user, illustrated as restricted portion 218. Functionality of operating system 200 may be restricted, for example, in exchange for a lower purchase price for computer 102. However, upon certain conditions being satisfied, an optional upgrade module 220 can "unlock" restricted portion 218 making the restricted functionality available to the user. Such restricted functionality and "unlocking" is discussed in more detail below.

Figure 4:
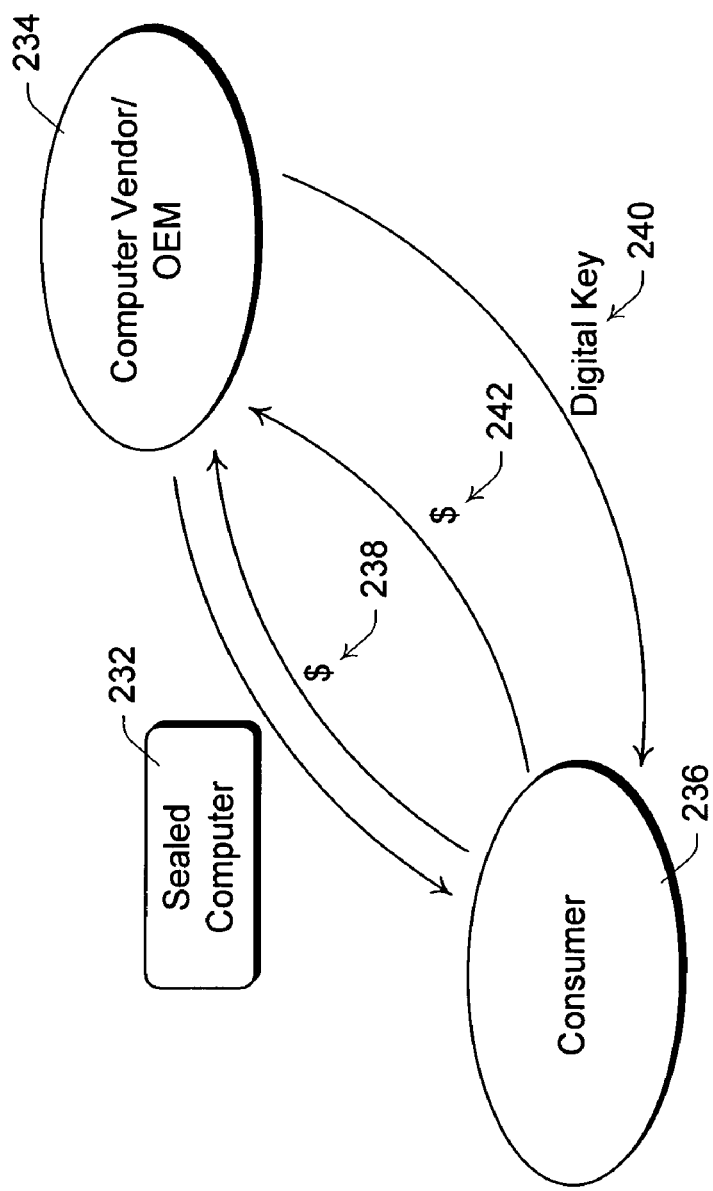
FIG. 4 is a flow diagram illustrating the distribution of a sealed computer and the unlocking of restricted functionality in accordance with one embodiment of the invention.

FIG. 4 is a flow diagram illustrating the distribution of a sealed computer and the unlocking of restricted functionality in accordance with one embodiment of the invention. A sealed computer 232 is distributed from a vendor or OEM 234 to a consumer 236. Sealed computer 232 can be, for example, client computer 102 of FIGS. 1 and 3, while vendor or OEM 234 can be, for example, vendor 106 or OEM 108 of FIG. 1. In exchange for sealed computer 232, consumer 236 provides an agreed upon sum of money 238 (or alternatively other compensation) to vendor or OEM 234.

Sealed computer 232 includes various software applications and device drivers for a general purpose open architecture operating system. However, additional software applications and device drivers cannot be added to the computer 232, thereby "sealing" the computer and restricting it to executing only specified software applications and device drivers.

The sealing of computer 232 ensures that consumer 236 is limited to executing only specific applications and device drivers (e.g., only those applications that are installed on computer 232 by vendor/OEM 234 and included on computer 232 at the time it is distributed to consumer 236). By preventing additional device drivers from being installed on computer 232, consumer 236 is further prevented from adding any additional peripheral devices (which would require an additional device driver(s)) to computer 232.

Purchase of a sealed computer 232 can be a great benefit for consumer 236. For example, consumer 236 could purchase a sealed computer at a lower price 238 than he or she would have paid for a non-sealed computer.

A computer 102 of FIG. 3 can be "sealed" using features of operating system 200. Digest catalog 210 is loaded with a digitally signed hash value (or alternatively other identifier) for the applications 202 and device drivers 204 that can be executed by computer 102. Operating system 200 allows only entities identified by access control list 214 to modify digest catalog 210, so unauthorized individuals/devices are not able to add hash values for additional applications or device drivers to digest catalog 210.

When a user wants to execute a particular software application 202, application loader 208 generates a hash value for the application 202 and checks whether a corresponding digitally signed hash value exists in digest catalog 210. If such a digitally signed hash value exists, then loader 208 loads the application; otherwise, loader 208 does not load the application. Analogous checks are performed by device loader 206 prior to loading a device driver 204 for use with a particular hardware device.

Other techniques for sealing the computer 102 can also be used, either in addition to or in place of the use of digest catalog 210 discussed above. For example, file system module 216 can prevent the alteration of the files stored on the storage devices of computer 102, such as by ignoring any requests to add or delete files. File system module 216 can prevent the alteration of files based on their location within the storage hierarchy of the storage devices (e.g., files cannot be deleted from particular folders or directories), based on their location on the storage device (e.g., files cannot be written to particular sectors of a hard disk), or alternatively without regard for the location of the files.

Figure 5:
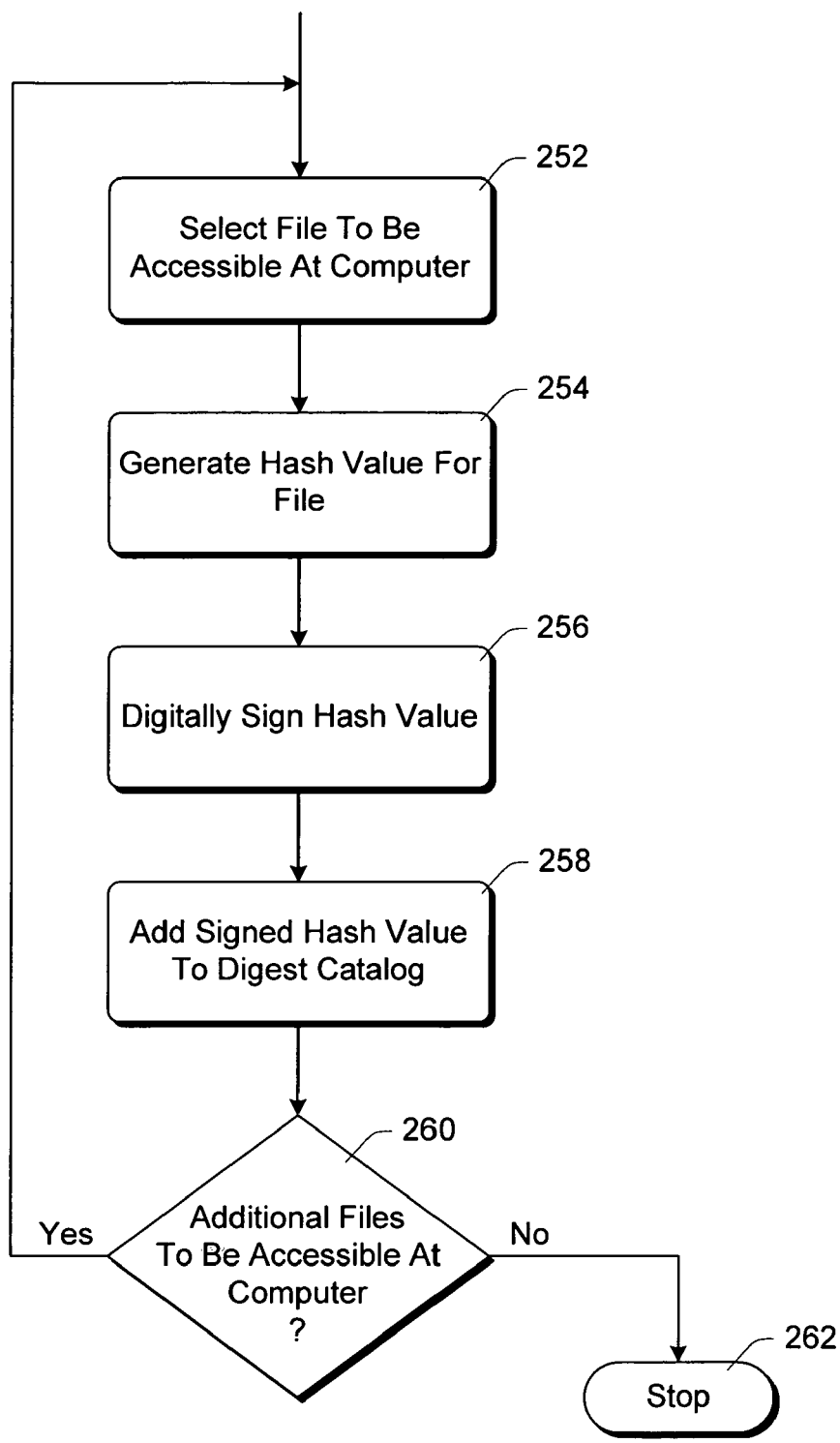
FIG. 5 is a flowchart illustrating an exemplary process for creating a digest catalog.

FIG. 5 is a flowchart illustrating an exemplary process for creating digest catalog 210 of FIG. 3. The acts of FIG. 5 are implemented by supplier 104, vendor 106, or OEM 108 of FIG. 1, or a combination thereof, and may be performed in software. FIG. 5 is described with additional reference to components in FIGS. 1 and 3.

Initially, a file that is to be accessible at the computer device is selected (act 252), such as a file including instructions for an application 202 or device driver 204. A hash value is then generated for the selected file (act 254). The hash value can be generated using any of a wide variety of conventional hash functions, including cryptographic one-way hash functions. Typically, such hash functions produce a different hash value for different input values.

The generated hash value is then digitally signed (act 256). The hash value can be digitally signed using any of a wide variety of conventional encryption techniques, such as the well-known RSA (Rivest, Shamir, and Adelman) public-key encryption technique. By digitally signing the hash value, device loader 206 or application loader 208 can subsequently verify that the hash value was signed by the appropriate device (e.g., supplier 104, vendor 106, or OEM 108) as discussed in more detail below.

The digitally signed hash value is then added to the digest catalog 210 (act 258). A check is then made as to whether any additional files are to be accessible at the computer (act 260). If no additional files are to be accessible at the computer, then the process ends (act 262). Otherwise, acts 252-258 are repeated for an additional file.

Figure 6:
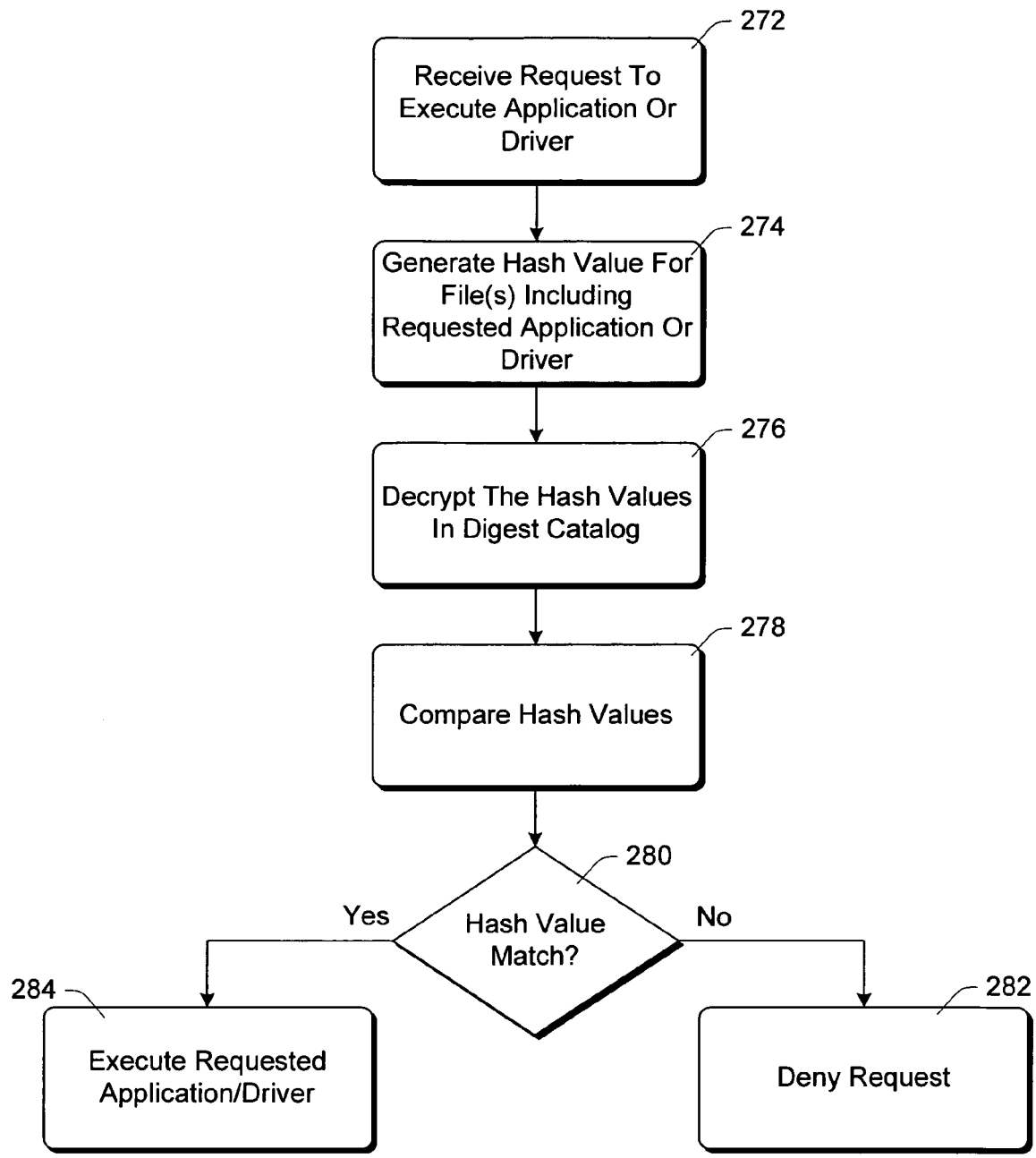
FIG. 6 is a flowchart illustrating an exemplary process for using a digest catalog.

FIG. 6 is a flowchart illustrating an exemplary process for using digest catalog 210 of FIG. 3 in accessing files. The acts of FIG. 6 are implemented by device loader 206 if a device driver 204 is to be loaded, and by application loader 208 if an application 202 is to be loaded. The process of FIG. 6 may be performed in software. FIG. 6 is described with additional reference to components in FIGS. 1, 3 and 5.

Eventually, a request to load a software application 202 or device driver 204 is received (act 272). In response to the request, application loader 208 (or device loader 206) generates a hash value for the file(s) including the requested application (or device driver) (act 274). The hash function used to generate the hash value in act 274 is the same hash function as was used to generate the hash value in act 254 of FIG. 5.

Application loader 208 (or device loader 206) then decrypts the hash values in digest catalog 210 (act 276). The manner in which the hash values are decrypted is dependent on the manner in which they were encrypted. By way of example, if RSA public-key encryption was used to digitally sign the hash values in act 256 of FIG. 5, then the public key for the signing device is used by loader 208 (or loader 206) in a conventional manner to decrypt the hash values.

Once decrypted, loader 208 (or loader 206) compares the decrypted hash values to the hash value generated in act 274 (act 278), and determines whether the generated hash value matches any of the decrypted hash values. If there is no match, then the request is denied and the requested software application 202 or device driver 204 is not loaded (act 282). However, if there is a match, then the request is executed and the requested software application 202 or device driver 204 is loaded and executed (act 284).

Thus, even if a user were to obtain additional application or device driver files and add them to computer 102, he or she would be unable to execute the corresponding application or driver as loader 206 or loader 208 would not load the files. Additionally, in some situations the user would be prevented from installing the application or device driver on computer 102. For example, many applications include an executable "setup" file that is executed by the processor of computer 102 and that controls the installation of the necessary files for the application. In such situations, if a digitally signed hash value for the setup file is not included in digest catalog 210, then the setup file could not be loaded and executed on computer 102.

Returning to FIG. 3, computer 102 may be a restricted device that can be subsequently upgraded. For example, certain functions may be stored in restricted portion 218 and thus be unavailable to the user. However, under the appropriate circumstances, the instructions in restricted portion 218 can be made available to the user.

Functionality of operating system 200 can be restricted in a variety of manners in addition to or in place of the use of digest catalog 210 described above. In accordance with one embodiment, the instructions that are executed by a processor to carry out the restricted functions are contained, in encrypted form, in restricted portion 218 of operating system 200. These instructions may be grouped together in particular files that are encrypted, or alternatively distributed (in encrypted form) throughout the instructions of operating system 200.

Referring again to FIG. 4, a digital key 240 can be obtained from vendor/OEM 234 in exchange for an agreed upon sum of money (or alternatively other compensation) 242. Digital key 240 is used to "unlock" or otherwise make available the restricted functionality of the restricted (or alternatively sealed) computer.

Figure 7:
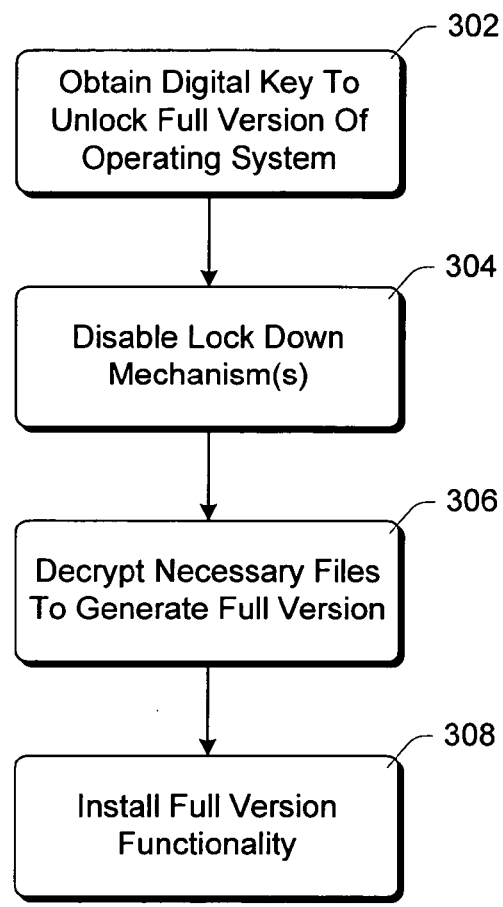
FIG. 7 is a flowchart illustrating an exemplary process for unlocking restricted functionality on a computer.

FIG. 7 is a flowchart illustrating an exemplary process for unlocking restricted functionality on a computer. The acts of FIG. 7 are implemented by upgrade module 220 of FIG. 3, and may be performed in software. FIG. 7 is described with additional reference to components in FIGS. 1 and 5.

Initially, upgrade module 220 obtains a digital key to unlock the full version of the operating system (act 302). The digital key is then used to turn off or disable the lock down mechanisms(s) at the computer (act 304). In one implementation, the lock down mechanisms are disabled by disabling the signature checking of device loader 206 and application loader 208 described above if the digital key is verified as being from the appropriate vendor (or OEM or supplier). This verification can be performed, for example, using the RSA public key of the vendor (or OEM or supplier).

The digital key is also used to decrypt any necessary files to generate the full version of the operating system (act 306). In one implementation, this decryption includes decrypting all of the instructions in restricted portion 218. The exact manner in which the decryption occurs is dependent on the manner in which the files were originally encrypted (which is known to upgrade module 220, or alternatively which is provided to upgrade module 220 by the appropriate vendor, OEM, or supplier).

The digital key can be used to decrypt the necessary files to generate the full version of the operating system (act 306) in any of a variety of manners. By way of example, the digital key obtained in act 302 may be (or may include) an RSA public key corresponding to the RSA private key that was used to encrypt the files prior to their placement in computer 102. This RSA public key can be used in a conventional manner to decrypt the encrypted files. The full version functionality of the operating system is then installed (act 308), making all of the functions in restricted portion 218 available to the user.

Returning again to FIG. 3, a computer 102 may be limited to executing only certain software applications 202 and/or device drivers 204, with device loader 206 and application loader 208 loading only those device drivers and applications that have a corresponding encrypted hash value in digest catalog 210. Additional applications 202 and device drivers 204 can be made available to the user of computer 102 by adding the appropriate digitally signed hash values to digest catalog 210. Thus, for example, a user could purchase an additional software application (or peripheral device with an associated device driver) and be able to execute that application (or peripheral/driver) by adding the appropriate digitally signed hash value(s) corresponding to the files of the application (or driver) to the digest catalog 210.

Figure 8:
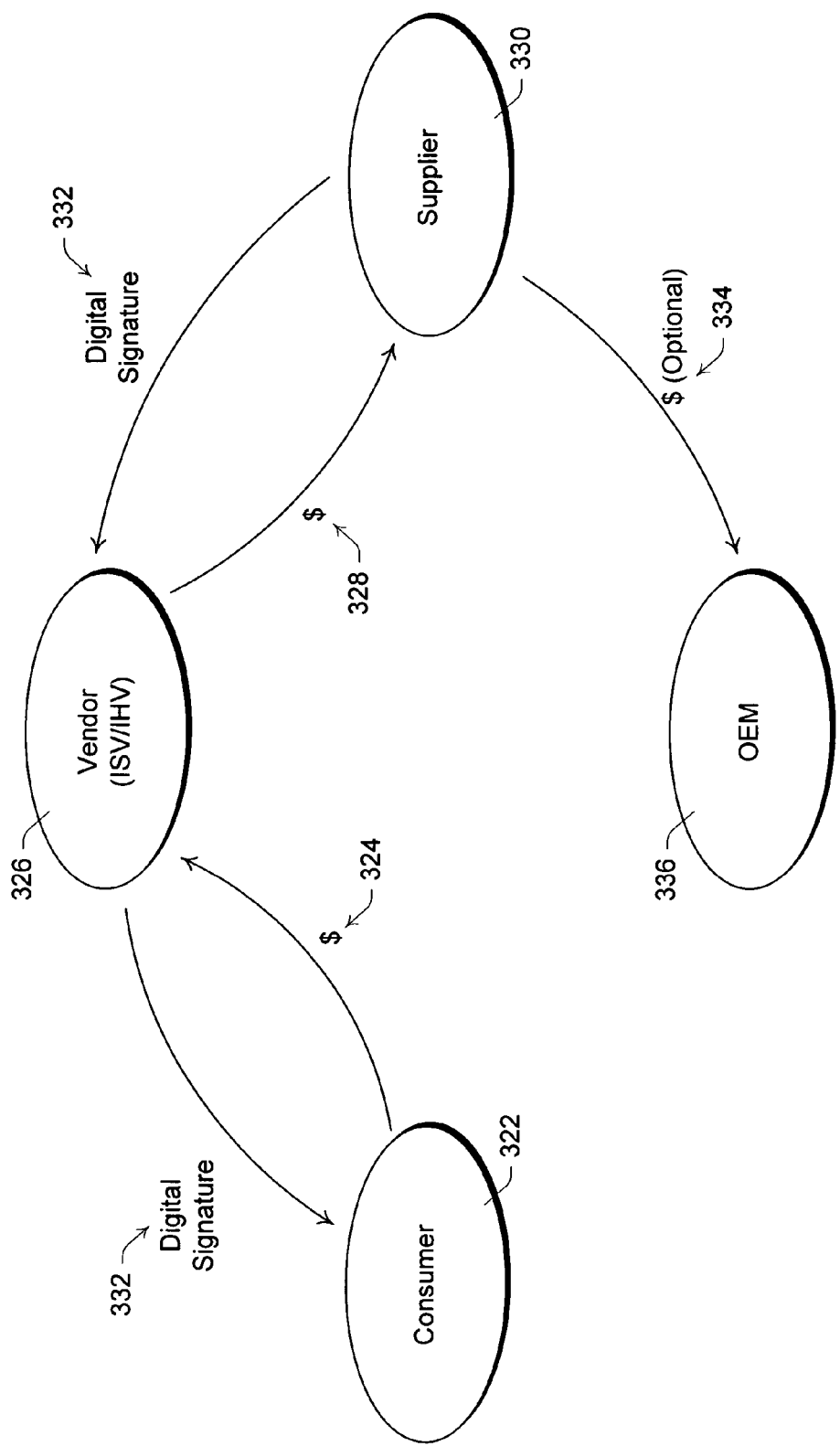
FIG. 8 is an exemplary flow diagram illustrating the distribution of digital signatures to add software applications and/or device drivers to a computer.

FIG. 8 is an exemplary flow diagram illustrating the distribution of digital signatures to add software applications and/or device drivers to a computer. Such applications or drivers can be new applications or drivers that the consumer has not previously installed, or alternatively can be updates or upgrades for previously installed applications. In the case of upgrades or updates, new digital signatures can be obtained for the files that are updated/upgraded. A consumer 322 (using client computer 102 of FIGS. 1 and 3) provides an agreed upon sum of money 324 (or alternatively other compensation) to vendor 326 in order to add the desired software applications and/or device drivers to his or her computer. Vendor 326 in turn provides an agreed upon sum of money 328 (or alternatively other compensation) to supplier 330.

Supplier 330 provides a digital signature 332 to vendor 326, which in turn provides digital signature 332 to consumer 322. By distributing digital signatures in the manner illustrated in FIG. 8, supplier 330 becomes the central authority for the distribution of the digital signatures.

Supplier 330 can optionally insist that vendor 326 satisfy various standards in order to obtain a digital signature. For example, supplier 330 may verify the identity of vendor 326 (e.g., using public key encryption techniques) and/or obtain assurances from vendor 326 that improper actions will not be taken with digital signature(s) it receives from supplier 330.

Additionally, supplier 330 may optionally provide a sum of money 334 (or alternatively other compensation) to an OEM 336 based on the receipt of money 328. Supplier 330 may do so, for example, to provide an additional incentive to OEM 336 to market/advertise products for which supplier 330 provides digital signatures 332.

By distributing digital signatures in the manner illustrated in FIG. 8, supplier 330 maintains control over who is able to purchase and use its applications and/or device drivers. This control is maintained regardless of which vendor or OEM a user purchases the application and/or device drivers from.

Figure 9:
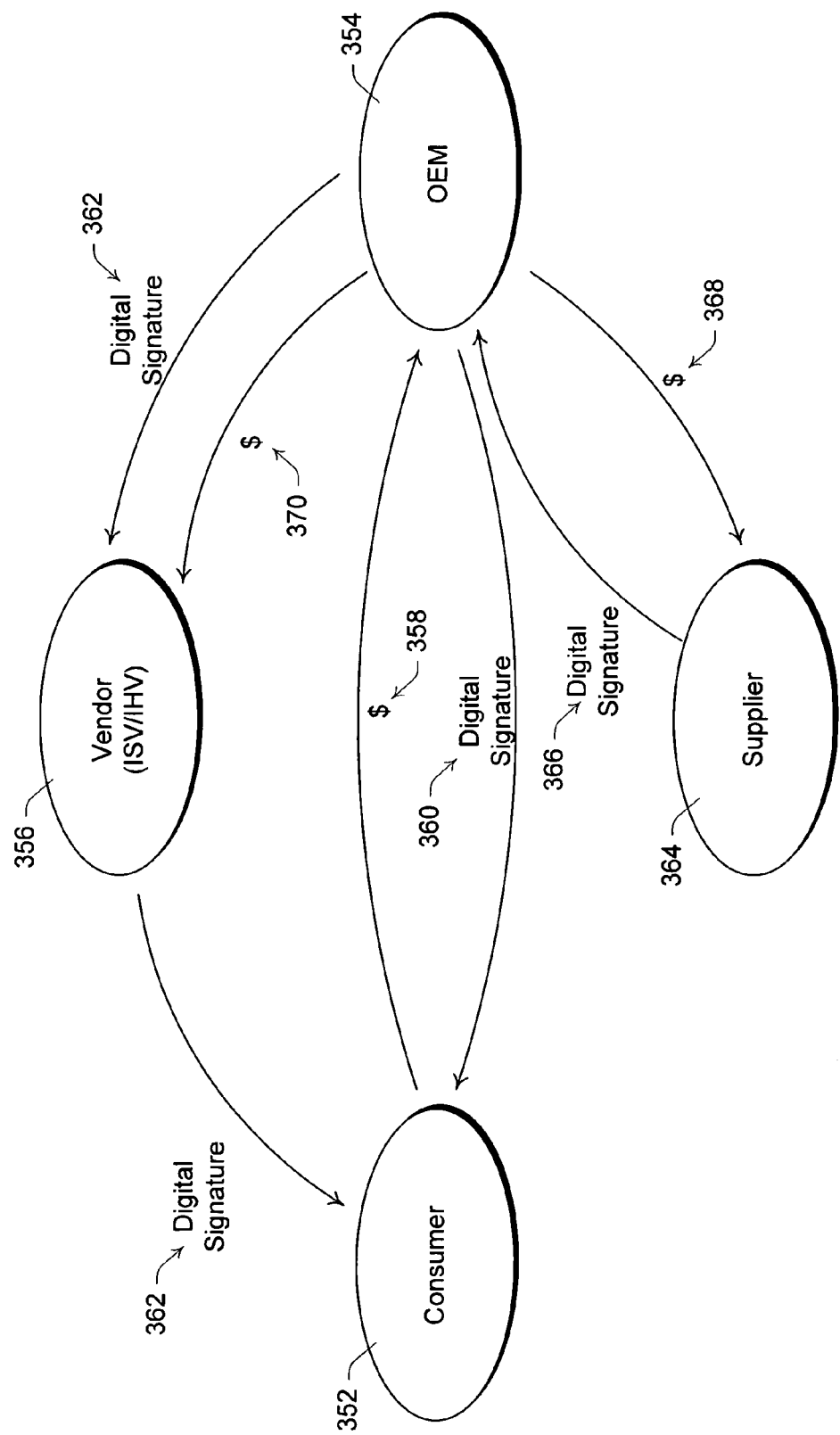
FIG. 9 is another exemplary flow diagram illustrating the distribution of digital signatures to add software applications and/or device drivers to a computer.

FIG. 9 is another exemplary flow diagram illustrating the distribution of digital signatures to add software applications and/or device drivers to a computer. Such applications or drivers can be new applications or drivers that the consumer has not previously installed, or alternatively can be updates or upgrades for previously installed applications. In the case of upgrades or updates, new digital signatures can be obtained for the files that are updated/upgraded. The discussion of FIG. 9 is made with additional reference to elements in FIG. 3. A consumer 352 (using a client computer 102 of FIGS. 1 and 3)

requests the ability to use a particular software application or device driver that is not already available to him or her on computer 102. This request is transmitted to OEM 354 either directly from consumer 352 or alternatively via vendor 356.

Consumer 352 provides an agreed upon sum of money 358 (or alternatively other compensation) to OEM in exchange for a digital signature that can be added to digest catalog 210. The digital signature can be provided directly to consumer 352 from OEM 354 (illustrated as digital signature 360), or alternatively via vendor 356 (illustrated as digital signature 362).

The digital signature that OEM 354 can provide to consumer 352 is received from supplier 364. Supplier 364 generates a digital signature (e.g., a digitally signed hash value) 366 for the application or device driver file(s) that correspond to the request of consumer 352. This digital signature 366 may be provided to consumer 352 as digital signature 360 or 362. Alternatively, OEM 354 may also digitally sign digital signature 366 and provide the resultant digital signature to consumer 352 as signature 360 or 362. Alternatively, supplier 364 may digitally sign files in different manners for different OEMs, thereby alleviating OEM 354 from having to re-sign the signatures it receives but still tying the digital signature to OEM 354.

OEM 354 also provides an agreed upon sum of money 368 (or alternatively other compensation) to supplier 364 in exchange for the digital signature 366. OEM 354 may also provide an agreed upon sum of money 370 (or alternatively other compensation) to vendor 356 (e.g., if the request for the ability to use the particular software application or device driver came from vendor 356, or if the digital signature is provided to consumer 352 via vendor 356).

Distributing digital signatures in the manner illustrated in FIG. 9 allows OEM 354 to maintain control over which applications and device drivers are executed on a computer. For example, if OEM 354 is the manufacturer of computer 102, OEM 354 can include digital signatures for only certain applications and device drivers in digest catalog 210 during the manufacturing process. Access control list 214 is also limited to include only OEM 354, thereby allowing only OEM 354 to alter the contents of digest catalog 210. These limitations on computer 102 limit the consumer to executing additional applications or device drivers only by obtaining the appropriate digital signatures for such, and the digital signatures can only come from OEM 354 (otherwise, they would not be added to digest catalog 210).

Consumer 352 can receive significant benefit from such a distribution method, as the cost of the initial computer 102 can be reduced; additional costs would be incurred only if and when consumer 352 wants the ability to execute the additional software applications or device drivers.

Furthermore, by obtaining subsequent software applications and device drivers directly from the same OEM as manufactured the computer, an additional level of assurance can be provided to the consumer that the requested applications/drivers will execute properly on computer 102. For example, a computer as described herein that cost the same amount—or more—would be advantageous to people because the OEM would allow only "high quality" (e.g., tested and verified) drivers and/or applications to be run on the computer, resulting in a more reliable experience for the end user.

Digest catalog 210 can be located locally at computer 102, or alternatively can be located at a remote location or separated among computer 102 and one or more remote locations.

Figure 10:
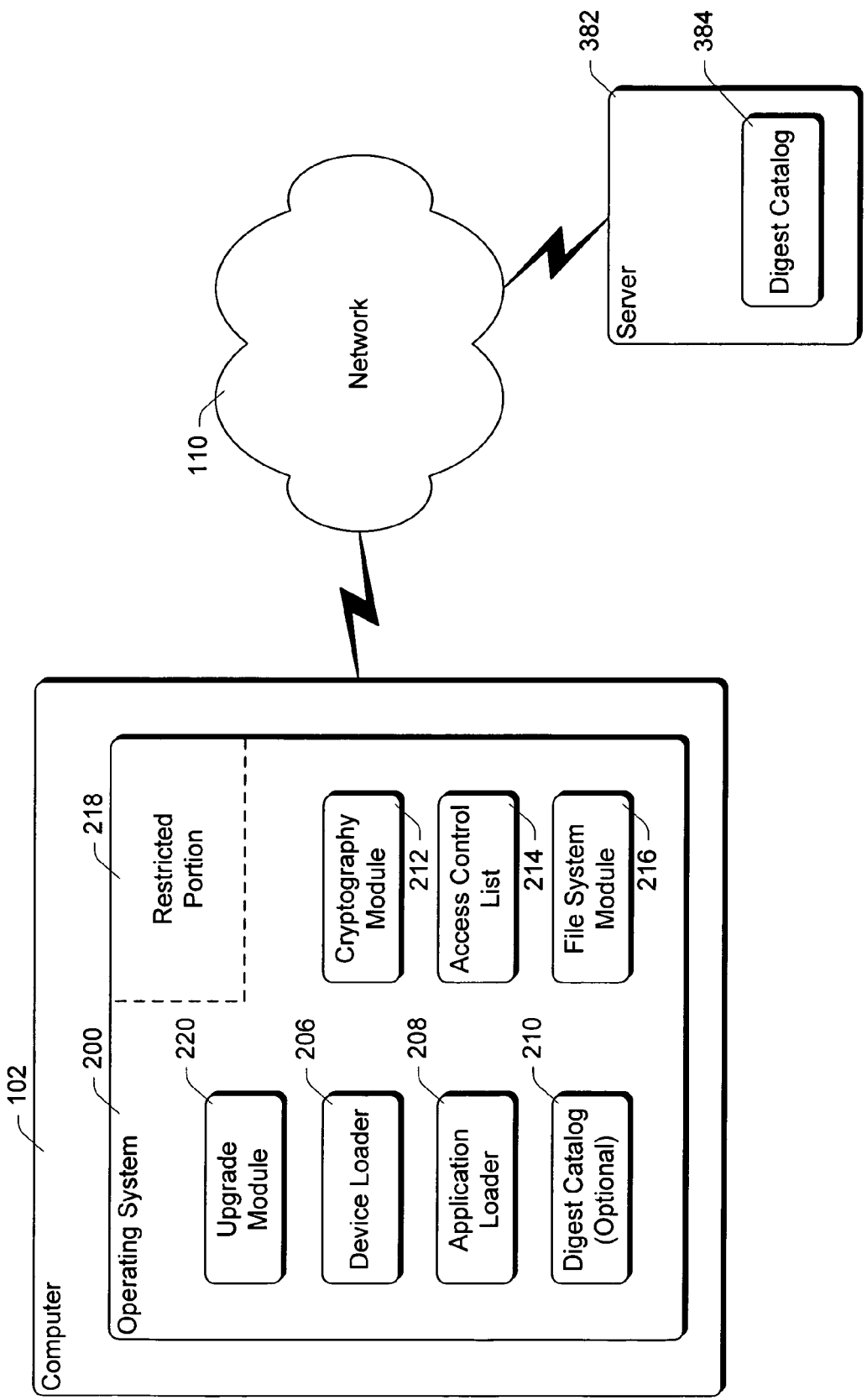
FIG. 10 is a block diagram illustrating the remote storage of a digest catalog in accordance with one embodiment of the invention.

FIG. 10 is a block diagram illustrating the remote storage of a digest catalog in accordance with one embodiment of the invention. A computer 102 is coupled to communicate with a server 382 via a data communications network 110. Server 382 can be any of a wide variety of conventional computing devices, such as computer 142 of FIG. 2. Server 382 further includes digest catalog 384.

In order to execute a particular software application or device driver, the appropriate loader 206 or 208 communicates over network 110 with server 382. The digitally signed hash value(s) for the files of the requested application or driver are compared to those in digest catalog 384 and loaded only if a match is found. This comparison can be performed locally at client 102 (e.g., by loaders 206 and 208) or alternatively remotely at server 382 and an indication returned to computer 102 from server 382 of the result of the comparison.

A consumer may provide monetary or other compensation to the owner of server 382 (e.g., OEM 354 of FIG. 9) in exchange for access to digest catalog 384. Such access may be for a limited time, such as monthly or annually. Such scenarios allow a user to obtain the ability to execute whatever applications/drivers are identified in digest catalog 384, which may be, for example, all of the software applications and drivers that are distributed by OEM 354. Such applications and drivers could be continually updated by OEM 354, thereby continually providing the consumer with the latest upgrades and versions of the applications and drivers.

The distribution models discussed above provide various techniques for expanding and/or contracting user rights. After distribution of a computer to a user, the user's rights can be expanded and/or contracted by, for example, a supplier 104 or OEM 108. The computer will not execute applications and/or drivers for which the user does not have appropriate rights, thereby limiting the user's ability to use the computer beyond the agreed upon rights.

Although the description above uses language that is specific to structural features and/or methodological acts, it is to be understood that the invention defined in the appended claims is not limited to the specific features or acts described. Rather, the specific features and acts are disclosed as exemplary forms of implementing the invention.

The invention claimed is:

1. A method comprising:
    identifying a set of files that include executable code that is to be available for execution by a computer, the computer including an operating system, an identifier of the set of files being included in a digest catalog; and
    preventing, by the operating system, additional files that are not identified in the digest catalog from being added to the computer.

2. A method as recited in claim 1, wherein the preventing comprises limiting access to portions of a storage device of the computer.

3. A method as recited in claim 1, wherein the preventing comprises preventing particular applications from being loaded into memory of the computer.

4. A method as recited in claim 1, further comprising receiving a payment for the computer that is less than payments received for computers that are not prevented from adding additional files that are not identified in the digest catalog.

5. A computer-readable media including computer-readable instructions executable by a processor of a computer including an operating system to:
    identify a set of files that include executable code that is to be available for execution by the computer, an identifier the set of files being included in a digest catalog; and
    prevent, by the operating system, additional files that are not identified in the digest catalog from being added to the computer.

6. The computer-readable media of claim 5, wherein the preventing comprises limiting access to portions of a storage device of the computer.

7. The computer-readable media of claim 5, wherein the preventing comprises preventing particular applications from being loaded into memory of the computer.

8. The computer-readable media of claim 5, further comprising receiving a payment for the computer that is less than payments received for computers that are not prevented from adding additional files that are not identified in the digest catalog.

9. The computer-readable media of claim 5, wherein the digest catalog includes an identifier for each file of the set of files.

10. The computer-readable media of claim 9, wherein each identifier is a hash value based on one of the files of the set of files.

11. The computer-readable media of claim 10, wherein each hash value is further encrypted.

12. The computer-readable media of claim 11, wherein each hash value is further encrypted to form a digital signature, wherein the each encrypted identifier is a digital signature.

13. The computer-readable media of claim 10, wherein the preventing comprises generating a hash value based on one of the additional files and, if the generated hash value is not is not found in the digest catalog, then preventing the one of the additional files from being added to the computer.

14. The computer-readable media of claim 13, wherein the adding comprises loading a file into a memory that is readable by the processor of the computer.

15. The method of claim 1, wherein the digest catalog includes an identifier for each file of the set of files.

16. The method of claim 15, wherein each identifier is a hash value based on one of the files of the set of files.

17. The method of claim 16, wherein each hash value is further encrypted.

18. The method of claim 17, wherein each hash value is further encrypted to form a digital signature, wherein the each encrypted identifier is a digital signature.

19. The method of claim 16, wherein the preventing comprises generating a hash value based on one of the additional files and, if the generated hash value is not is not found in the digest catalog, then preventing the one of the additional files from being added to the computer.

20. The method of claim 19, wherein the adding comprises loading a file into a memory that is readable by the processor of the computer.

* * * * *